US009866731B2

(12) United States Patent
Godfrey et al.

(10) Patent No.: US 9,866,731 B2
(45) Date of Patent: Jan. 9, 2018

(54) COORDINATING AND MIXING AUDIOVISUAL CONTENT CAPTURED FROM GEOGRAPHICALLY DISTRIBUTED PERFORMERS

(71) Applicant: Smule, Inc., San Francisco, CA (US)

(72) Inventors: Mark T. Godfrey, San Francisco, CA (US); Perry R. Cook, Applegate, OR (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 14/928,727

(22) Filed: Oct. 30, 2015

(65) Prior Publication Data

US 2016/0057316 A1  Feb. 25, 2016

Related U.S. Application Data

(60) Continuation-in-part of application No. 14/656,344, filed on Mar. 12, 2015, which is a division of
(Continued)

(51) Int. Cl.
*G10L 21/013* (2013.01)
*H04N 5/04* (2006.01)
(Continued)

(52) U.S. Cl.
CPC ............... *H04N 5/04* (2013.01); *G10H 1/366* (2013.01); *G10L 13/0335* (2013.01);
(Continued)

(58) Field of Classification Search
CPC . G10H 1/366; G10H 2210/331; G10L 21/013
See application file for complete search history.

(56) References Cited

U.S. PATENT DOCUMENTS 4,688,464 A   8/1987  Gibson et al.
5,231,671 A   7/1993  Gibson et al.
(Continued)

FOREIGN PATENT DOCUMENTS

EP          2018058      * 1/2009  ............... H04N 7/14
JP       2006-311079 A    11/2006
WO      WO2011/130325    10/2011

OTHER PUBLICATIONS

Movie Maker, "Windows Movie Maker: Transitions and Video Effects", [online], published Jan. 2007.*
(Continued)

*Primary Examiner* — Jialong He
(74) *Attorney, Agent, or Firm* — Haynes and Boone, LLP

(57) ABSTRACT

Audiovisual performances, including vocal music, are captured and coordinated with those of other users in ways that create compelling user experiences. In some cases, the vocal performances of individual users are captured (together with performance synchronized video) on mobile devices, television-type display and/or set-top box equipment in the context of karaoke-style presentations of lyrics in correspondence with audible renderings of a backing track. Contributions of multiple vocalists are coordinated and mixed in a manner that selects for visually prominent presentation performance synchronized video of one or more of the contributors. Prominence of particular performance synchronized video may be based, at least in part, on computationally-defined audio features extracted from (or computed over) captured vocal audio. Over the course of a coordinated audiovisual performance timeline, these computationally-defined audio features are selective for performance synchronized video of one or more of the contributing vocalists.

26 Claims, 6 Drawing Sheets

Related U.S. Application Data application No. 13/085,414, filed on Apr. 12, 2011, now Pat. No. 8,983,829.

(60) Provisional application No. 62/072,558, filed on Oct. 30, 2014.

(51) Int. Cl.
G10L 13/033 (2013.01)
G10H 1/36 (2006.01)

(52) U.S. Cl.
CPC ...... G10L 21/013 (2013.01); G10H 2210/066 (2013.01); G10H 2210/331 (2013.01); G10H 2240/251 (2013.01); Y10S 84/04 (2013.01)

(56) References Cited

U.S. PATENT DOCUMENTS

| | | | |
|---|---|---|---|
| 5,301,259 A | 4/1994 | Gibson et al. | |
| 5,477,003 A | 12/1995 | Muraki et al. | |
| 5,719,346 A | 2/1998 | Yoshida et al. | |
| 5,811,708 A | 9/1998 | Matsumoto | |
| 5,889,223 A | 3/1999 | Matsumoto | |
| 5,902,950 A | 5/1999 | Kato et al. | |
| 5,939,654 A | 8/1999 | Anada | |
| 5,966,687 A | 10/1999 | Ojard | |
| 6,121,531 A | 9/2000 | Kato | |
| 6,307,140 B1 | 10/2001 | Iwamoto | |
| 6,336,092 B1 | 1/2002 | Gibson et al. | |
| 6,353,174 B1 | 3/2002 | Schmidt et al. | |
| 6,369,311 B1 | 4/2002 | Iwamoto | |
| 6,971,882 B1 | 12/2005 | Kumar et al. | |
| 7,003,496 B2 | 2/2006 | Ishii et al. | |
| 7,068,596 B1 | 6/2006 | Mou | |
| 7,096,080 B2 | 8/2006 | Asada et al. | |
| 7,297,858 B2 | 11/2007 | Paepcke | |
| 7,853,342 B2 | 12/2010 | Redmann | |
| 2002/0004191 A1 | 1/2002 | Tice et al. | |
| 2002/0032728 A1 | 3/2002 | Sako et al. | |
| 2002/0051119 A1 | 5/2002 | Sherman et al. | |
| 2002/0056117 A1 | 5/2002 | Hasegawa et al. | |
| 2002/0091847 A1 | 7/2002 | Curtin | |
| 2002/0177994 A1 | 11/2002 | Chang et al. | |
| 2003/0014262 A1 | 1/2003 | Kim | |
| 2003/0099347 A1 | 5/2003 | Ford et al. | |
| 2003/0100965 A1 | 5/2003 | Sitrick et al. | |
| 2003/0117531 A1 | 6/2003 | Rovner et al. | |
| 2003/0164924 A1 | 9/2003 | Sherman et al. | |
| 2004/0159215 A1 | 8/2004 | Tohgi et al. | |
| 2004/0263664 A1 | 12/2004 | Aratani et al. | |
| 2005/0120865 A1 | 6/2005 | Tada | |
| 2005/0123887 A1 | 6/2005 | Joung et al. | |
| 2005/0252362 A1 | 11/2005 | McHale et al. | |
| 2006/0165240 A1 | 7/2006 | Bloom et al. | |
| 2006/0206582 A1 | 9/2006 | Finn | |
| 2007/0065794 A1 | 3/2007 | Mangum | |
| 2007/0150082 A1 | 6/2007 | Yang et al. | |
| 2007/0245882 A1 | 10/2007 | Odenwald | |
| 2007/0250323 A1 | 10/2007 | Dimkovic et al. | |
| 2007/0260690 A1 | 11/2007 | Coleman | |
| 2007/0287141 A1* | 12/2007 | Milner ............... | G09B 5/00 434/307 A |
| 2007/0294374 A1 | 12/2007 | Tamori | |
| 2008/0033585 A1 | 2/2008 | Zopf | |
| 2008/0105109 A1 | 5/2008 | Li et al. | |
| 2008/0156178 A1 | 7/2008 | Georges et al. | |
| 2008/0190271 A1 | 8/2008 | Taub et al. | |
| 2008/0312914 A1 | 12/2008 | Rajendran et al. | |
| 2009/0003659 A1 | 1/2009 | Forstall et al. | |
| 2009/0038467 A1 | 2/2009 | Brennan | |
| 2009/0106429 A1 | 4/2009 | Siegal et al. | |
| 2009/0107320 A1 | 4/2009 | Willacy et al. | |
| 2009/0165634 A1 | 7/2009 | Mahowald | |
| 2010/0087240 A1 | 4/2010 | Egozy et al. | |
| 2010/0126331 A1 | 5/2010 | Golovkin et al. | |
| 2010/0142926 A1 | 6/2010 | Coleman | |
| 2010/0157016 A1* | 6/2010 | Sylvain ............... | H04N 7/15 348/14.08 |
| 2010/0192753 A1 | 8/2010 | Gao et al. | |
| 2010/0203491 A1 | 8/2010 | Yoon | |
| 2010/0326256 A1 | 12/2010 | Emmerson | |
| 2011/0126103 A1 | 5/2011 | Cohen et al. | |
| 2011/0144981 A1 | 6/2011 | Salazar et al. | |
| 2011/0144982 A1 | 6/2011 | Salazar et al. | |
| 2011/0144983 A1 | 6/2011 | Salazar et al. | |
| 2011/0251841 A1 | 10/2011 | Cook et al. | |
| 2014/0290465 A1 | 10/2014 | Salazar et al. | |
| 2015/0201161 A1* | 7/2015 | Lachapelle ............... | H04N 7/15 348/14.07 |

OTHER PUBLICATIONS

Kuhn, William. "A Real-Time Pitch Recognition Algorithm for Music Applications." Computer Music Journal, vol. 14, No. 3, Fall 1990, Massachusetts Institute of Technology, Print pp. 60-71.

Johnson. Joel. "Glee on iPhone More than Good—It's Fabulous." Apr. 15, 2010. Web. http://gizmodo.com/5518067/glee-on-iphone-more-than-goodits-fabulous. Accessed Jun. 28, 2011. p. 1-3.

Wortham, Jenna. "Unleash Your Inner Gleek on the iPad." Bits, The New York Times. Apr. 15, 2010. Web. https://bits.blogs.nytimes.com/2010/04/15/unleash-your-inner-gleek-on-the-ipad/.

Gerard, David. "Pitch Extraction and Fundamental Frequency: History and Current Techniques." Department of Computer Science, University of Regina, Saskatchewan, Cananda. Nov. 2003 Print. p. 1-22.

"Auto-Tune: Intonation Correcting Plug-In." User's Manual. Antares Audio Technologies. 2000. Print. p. 1-52.

Trueman, Daniel. et al "PLOrk: the Princton Laptop Orchestra, Year 1." Music Department, Princeton University. 2009 Print. 10 pages.

Conneally, Tim. "The Age of Egregious Auto-tuning: 1998-2009." Tech Gear News-Betanews. Jun. 15, 2009. Web. www.betanews.com/artical/the-age-of-egregious-autotuning-19982009/1245090927 Accessed. Dec. 10, 2009.

Baran, Tom. "Autotalent v0.2: Pop Music in a Can!" Department of Electrical Engineering and Computer Science, Massachusetts Institute of Technology. May 22, 2011. Web., http://web.mit.edu/tbaran/www/autotalent.html> Accessed Jul. 5, 2011. p. 1-5.

Atal, Bishnu S. "The History of Linear Prediction." IEEE Signal Processing Magazine. vol. 154, Mar. 2006 Print. p. 154-161.

Shaffer, H. and Ross, M. and Cohen, A. "AMDF Pitch Extractor." 85th Meeting Acoustical Society of America. vol. 54:1, Apr. 13, 1973. Print. p. 340.

Kumparak, Greg. "Gleeks Rejoice! Smule Packs Fox's Glee Into a Fantastic IPhone Application" MobilCrunch. Apr. 15, 2010 Web. Accessed Jun. 28, 2011; <http://www.mobilecrunch.com/2010/04/15gleeks-rejoice-smule-packs-foxs-glee-into-a-fantastic-iphone-app/>.

Rabiner, Lawrence R. "On the Use of Autocorrelation Analysis for Pitch Detection." IEEE Transactions on Acoustics, Speech, and Signal Processing. vol. Assp. -25:1 Feb. 1977. Print p. 24-33.

Wang, Ge. "Designing Smule's IPhone Ocarina." Center for Computer Research in Music and Acoustics, Standford University. Jun. 2009. Print 5 pages.

Clark, Don; "MuseAmi Hopes to Take Music Automation to New Level." The Wall Street Journal, Digits, Technology News and Insigts, Mar. 19, 2010 Web. Accessed Jul. 6, 2011 <http://blogs.wsj.com/digits/2010/19/museami-hopes-to-take-music-automation-to-new-level/>.

U.S. Appl. No. 13/085,414, filed Apr. 12, 2011.

U.S. Appl. No. 13/085,415, filed Apr. 12, 2011.

Ananthapadmanabha, Tirupattur V. et al. "Epoch Extraction from Linear Prediction Residual for Identification of Closed Glottis Interval." IEEE Transactions on Acoustics, Speech, and Signal Processing, vol. ASSP-27:4. Aug. 1979. Print. p. 309-319.

Baran, Tom, "Autotalent v0.2", Digital Signal Processing Group, Department of Electrical Engineering and Computer Science, Massachusetts Institute of Technology, http://;web.mit.edu/tbaran/www/autotalent.html, Jan. 31, 2011.

(56) References Cited

OTHER PUBLICATIONS

Cheng, M.J. "Some Comparisons Among Several Pitch Detection Algorithms." Bell Laboratories. Murray Hill, NJ. 1976. p. 332-335.
International Search Report and Written Opinion mailed in International Application No. PCT/US10/60135 dated Feb. 8, 2011, 17 pages.
International Search Report mailed in International Application No. PCT/US2011/032185 dated Aug. 17, 2011, 6 pages.
Johnson-Bristow, Robert. "A Detailed Analysis of a Time-Domain Formant Corrected Pitch Shifting Alogorithm" AES: An Audio Engineering Society Preprint. Oct. 1993. Print. 24 pages.
Lent, Keith. "An Efficient Method for Pitch Shifting Digitally Sampled Sounds." Departments of Music and Electrical Engineering, University of Texas at Austin. Computer Music Journal, vol. 13:4, Winter 1989, Massachusetts Institute of Technology. Print. p. 65-71.
McGonegal, Carol A. et al. "A Semiautomatic Pitch Detector (SAPD)." Bell Laboratories. Murray Hill, NJ. May 19, 1975. Print. p. 570-574.
Ying, Goangshivan S. et al. "A Probabilistic Approach to AMDF Pitch Detection." School of Electrical and Computer Engineering, Purdue University. 1996. Web. <http://purcell.ecn.purdue.edu/~speechg>. Accessed Jul. 5, 2011. 5 pages.
PCT International Search Report of International Search Authority for counterpart application, dated Feb. 17, 2016, of PCT/US2015/058373 filed Oct. 30, 2015.

\* cited by examiner

COORDINATING AND MIXING AUDIOVISUAL CONTENT CAPTURED FROM GEOGRAPHICALLY DISTRIBUTED PERFORMERS

CROSS-REFERENCE TO RELATED APPLICATION(S)

The present application claims priority under 35 U.S.C. §119(e) to U.S. Application No. 62/072,558, filed Oct. 30, 2014, entitled "Coordinating and Mixing Audiovisual Content Captured from Geographically Distributed Performers," and naming Mark T Godfrey and Perry R. Cook as inventors. The present application is also a continuation-in-part of commonly-owned, co-pending U.S. application Ser. No. 14/656,344, filed Mar. 12, 2015, which is, in turn, a divisional of U.S. application Ser. No. 13/085,414, filed Apr. 12, 2011 (now U.S. Pat. No. 8,983,829). Each of the foregoing applications is incorporated herein by reference.

BACKGROUND

Field of the Invention

The invention relates generally to capture and/or processing of audiovisual performances and, in particular, to techniques suitable for use in manipulating visual prominence of performance synchronized video in a coordinated audiovisual performance of multiple performer contributions.

Description of the Related Art

The installed base of mobile phones, personal media players, and portable computing devices, together with media streamers and television set-top boxes, grows in sheer number and computational power each day. Hyper-ubiquitous and deeply entrenched in the lifestyles of people around the world, many of these devices transcend cultural and economic barriers. Computationally, these computing devices offer speed and storage capabilities comparable to engineering workstation or workgroup computers from less than ten years ago, and typically include powerful media processors, rendering them suitable for real-time sound synthesis and other musical applications. Partly as a result, some modern devices, such as iPhone®, iPad®, iPod Touch® and other iOS® or Android devices, support audio and video processing quite capably, while at the same time providing platforms suitable for advanced user interfaces. Indeed, applications such as the Smule Ocarina™, Leaf Trombone®, I Am T-Pain™, AutoRap®, Sing! Karaoke™, Guitar! By Smule®, and Magic Piano® apps available from Smule, Inc. have shown that advanced digital acoustic techniques may be delivered using such devices in ways that provide compelling musical experiences.

Devices having AirPlay® modes of operation popularized by Apple, Inc. have been used to wirelessly mirror content to television displays, thereby providing a larger screen experience for content and features available from using a mobile phone. For example, an Apple TV™ set top box may be connected to a standard television or other display device to provide such mirroring. Apple TV devices, as well as competitive TV-connected media streaming devices, may support retrieval and rendering of content from a network, as well as the execution of games, entertainment applications, etc.

As researchers seek to transition their innovations to commercial applications deployable to modern handheld devices and media application platforms within the real-world constraints imposed by processor, memory and other limited computational resources thereof and/or within communications bandwidth and transmission latency constraints typical of wireless networks, significant practical challenges present. Improved techniques and functional capabilities are desired, particularly relative to audiovisual content and user interfaces.

SUMMARY

It has been discovered that, despite practical limitations imposed by mobile device platforms and media application execution environments, audiovisual performances, including vocal music, may be captured and coordinated with those of other users in ways that create compelling user experiences. In some cases, the vocal performances of individual users are captured (together with performance synchronized video) on mobile devices in the context of a karaoke-style presentation of lyrics in correspondence with audible renderings of a backing track. Contributions of multiple vocalists are coordinated and mixed in a manner that selects for prominent presentation performance synchronized video of one or more of the contributors. The prominent presentation of particular performance synchronized video may be based, at least in part, on time-varying, computationally-defined audio features extracted from (or computed over) captured vocal audio. Over the course of a coordinated audiovisual mix, these computationally-defined audio features are selective for performance synchronized video of one or more of the contributing vocalists.

Optionally, and in some cases or embodiments, vocal audio can be pitch-corrected in real-time at the mobile device (or more generally, at a portable computing device such as a mobile phone, personal digital assistant, laptop computer, notebook computer, pad-type computer or netbook, or on a content or media application server) in accord with pitch correction settings. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score coded melody or even actual pitches sounded by a vocalist, if desired.

Based on the compelling and transformative nature of the pitch-corrected vocals, performance synchronized video and score-coded harmony mixes, user/vocalists may overcome an otherwise natural shyness or angst associated with sharing their vocal performances. Instead, even geographically distributed vocalists are encouraged to share with friends and family or to collaborate and contribute vocal performances as part of social music networks. In some implementations, these interactions are facilitated through social network- and/or eMail-mediated sharing of performances and invitations to join in a group performance. Living room-style, large screen user interfaces may facilitate these interations. Using uploaded vocals captured at clients such as the aforementioned portable computing devices, a content server (or service) can mediate such coordinated performances by manipulating and mixing the uploaded audiovisual content of multiple contributing vocalists. Depending on the goals and implementation of a particular system, in addition to video content, uploads may include pitch-corrected vocal performances (with or without harmonies), dry (i.e., uncorrected) vocals, and/or control tracks of user key and/or pitch correction selections, etc.

Social music can be mediated in any of a variety of ways. For example, in some implementations, a first user's vocal performance, captured against a backing track at a portable computing device and typically pitch-corrected in accord with score-coded melody and/or harmony cues, is supplied to other potential vocal performers. Performance synchronized video is also captured and may be supplied with the pitch-corrected, captured vocals. The supplied vocals are mixed with backing instrumentals/vocals and forms the backing track for capture of a second user's vocals. Often, successive vocal contributors are geographically separated and may be unknown (at least a priori) to each other, yet the intimacy of the vocals together with the collaborative experience itself tends to minimize this separation. As successive vocal performances and video are captured (e.g., at respective portable computing devices) and accreted as part of the social music experience, the backing track against which respective vocals are captured may evolve to include previously captured vocals of other contributors.

In some cases, captivating visual animations and/or facilities for listener comment and ranking, as well as duet, glee club or choral group formation or accretion logic are provided in association with an audible rendering of a vocal performance (e.g., that captured and pitch-corrected at another similarly configured mobile device) mixed with backing instrumentals and/or vocals. Synthesized harmonies and/or additional vocals (e.g., vocals captured from another vocalist at still other locations and optionally pitch-shifted to harmonize with other vocals) may also be included in the mix. Geocoding of captured vocal performances (or individual contributions to a combined performance) and/or listener feedback may facilitate animations or display artifacts in ways that are suggestive of a performance or endorsement emanating from a particular geographic locale on a user manipulable globe. In this way, implementations of the described functionality can transform otherwise mundane mobile devices and living room or entertainment systems into social instruments that foster a unique sense of global connectivity, collaboration and community.

Accordingly, techniques have been developed for capture vocal performances and associated video on handheld, portable devices (as well as in living-room entertainment system contexts) using signal processing techniques and data flows suitable given the capabilities of such devices and in ways that facilitate efficient encoding and communication of such captured performances via ubiquitous, though typically bandwidth-constrained, wireless networks. The developed techniques facilitate the capture, coordination, pitch correction, harmonization and encoding of vocal performances for mixing with additional captured vocals, pitch-shifted harmonies and backing instrumentals and/or vocal tracks as well as the subsequent rendering of mixed audiovisual performances on remote devices.

In some embodiments of the present invention, a method of preparing coordinated audiovisual performances from geographically distributed performer contributions includes receiving via a communication network, a first audiovisual encoding of a first performer, including first performer vocals captured at a first remote device and receiving via the communication network, a second audiovisual encoding of a second performer, including second performer vocals captured at a second remote device. The method further includes determining at least one time-varying, computationally-defined audio feature for the first performer vocals and determining at least one time-varying, computationally-defined audio feature for the second performer vocals. Based on comparison of the computationally-defined audio feature for first and second performer vocals, relative visual prominence of respective first and second performers is dynamically varied throughout a combined audiovisual performance mix of the captured first and second performer vocals with the backing track.

In some cases or embodiments, the first and second first audiovisual encodings include, in addition to captured vocals, performance synchronized video captured at the respective remote device. In some embodiments, the method further includes mixing the first performer vocals with a backing track and supplying a second remote device with a resulting first mixed audiovisual performance, wherein the second performer vocals are captured against a local audio rendering, at the second remote device, of the first mixed audiovisual performance.

In some cases or embodiments, the computationally-defined audio feature includes an audio power measure. In some cases or embodiments, the computationally-defined audio feature includes one or more of: a spectral flux or centroid, a measure of tempo or pitch correspondence with a melody or harmony track or score, and an audio power measure.

In some cases or embodiments, the dynamic varying of relative visual prominence includes transitioning between prominent visual presentation of first performer video captured at the first remote device and prominent visual presentation of second performer video captured at the second remote device. In some cases or embodiments, the e transitioning includes switching, wiping or crossfading of respective performer video. In some cases or embodiments, the transitioning is performed, at least in some cases, pre-causally relative to a triggering change in relative values of the computationally-defined audio feature. In some cases or embodiments, the pre-causal transitioning prominently presents performer video beginning just prior to onset of corresponding prominent vocals. In some cases or embodiments, the transitioning is subject to duration filtering or a hysteresis function. In some cases or embodiments, duration filtering or hysteresis function parameters are selected to limit excessive visual transitions between performers.

In some cases or embodiments, the transitioning is amongst video corresponding to three or more performers and their respective vocal performances. In some cases or embodiments, the dynamically varied relative visual prominence includes, for at least some values of the computationally-defined audio feature, visual presentation of both first and second performer video, though with differing visual prominence. In some cases or embodiments, the dynamically varied relative visual prominence includes, for at least some values of the computationally-defined audio feature, visual presentation of both first and second performer video, with generally co-equal levels of visual prominence. In some cases or embodiments, the dynamically varied relative visual prominence includes, for at least some values of the computationally-defined audio feature, visual presentation of first or second performer video, but not both.

In some cases or embodiments, the computationally-defined audio feature includes an audio power measure. In some cases or embodiments, the computationally-defined audio feature is computed over pre-processed audio signals. In some cases or embodiments, the pre-processing of the audio signals includes one or more of: application of a bark-band auditory model, vocal detection, and noise cancellation. In some cases or embodiments, the preprocessing is performed, at least in part, at the respective first or second remote device.

In some embodiments, the method further includes inviting via electronic message or social network posting at least the second performer to join the combined audiovisual performance. In some cases or embodiments, the inviting includes the supplying of the second remote device with the resulting first mixed audiovisual performance.

In some embodiments, the method further includes supplying the first and second remote devices with corresponding, but differing, versions of the combined audiovisual performance mix, wherein the combined audiovisual performance mix supplied to the first remote device features the first performer video and vocals more prominently than the second performer video and vocals, and wherein the combined performance mix supplied to the second remote device features the second performer video and vocals more prominently than the first performer video and vocals. In some cases or embodiments, the more prominently featured of the first and second performer vocals is pitch-shifted to a vocal melody position in at least one of the corresponding, but differing, combined audiovisual performance mix versions supplied, and a less prominently featured of the first and second performer vocals is pitch-shifted to a harmony position. In some cases or embodiments, amplitudes of respective spatially differentiated audio channels of the first and second performer vocals are adjusted to provide apparent spatial separation therebetween in the supplied audiovisual performance mix versions.

In some embodiments, the method further includes supplying the first and second remote devices with a vocal score that encodes (i) a sequence of notes for a vocal melody and (ii) at least a first set of harmony notes for at least some portions of the vocal melody, wherein at least one of the received first and second performer vocals is pitch corrected at the respective first or second remote device in accord with the supplied vocal score.

In some embodiments, the method further includes pitch correcting at least one of the received first and second performer vocals in accord with a vocal score that encodes (i) a sequence of notes for a vocal melody and (ii) at least a first set of harmony notes for at least some portions of the vocal melody.

In some embodiments, the method further includes mixing either or both of the first and second performer vocals with the backing track and supplying a third remote device with a second mixed audiovisual performance; and receiving via the communication network, a third audiovisual encoding of a third performer, including third performer vocals captured at the third remote device against a local audio rendering of the second mixed performance. In some embodiments, the method further includes including the captured third performer vocals in the combined audiovisual performance mix.

In some cases or embodiments, the first and second portable computing devices are selected from the group of a mobile phone; a personal digital assistant; a laptop computer, notebook computer, a pad-type computer or netbook.

These and other embodiments in accordance with the present invention(s) will be understood with reference to the description and appended claims which follow.

BRIEF DESCRIPTION OF THE DRAWINGS

The present invention(s) are illustrated by way of examples and not limitation with reference to the accompanying figures, in which like references generally indicate similar elements or features.

Skilled artisans will appreciate that elements or features in the figures are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DESCRIPTION

Techniques have been developed to facilitate the capture, pitch correction, harmonization, encoding and rendering of audiovisual performances on portable computing devices and living room-style entertainment equipment. Vocal audio together with performance synchronized video is captured and coordinated with audiovisual contributions of other users to form duet-style or glee club-style audiovisual performances. In some cases, the vocal performances of individual users are captured (together with performance synchronized video) on mobile devices, television-type display and/or set-top box equipment in the context of karaoke-style presentations of lyrics in correspondence with audible renderings of a backing track.

Contributions of multiple vocalists are coordinated and mixed in a manner that selects for visually prominent presentation performance synchronized video of one or more of the contributors. Prominence of particular performance synchronized video may be based, at least in part, on computationally-defined audio features extracted from (or computed over) captured vocal audio. Over the course of a coordinated audiovisual performance timeline, these computationally-defined audio features are selective for performance synchronized video of one or more of the contributing vocalists.

Karaoke-Style Vocal Performance Capture

Figure 1:
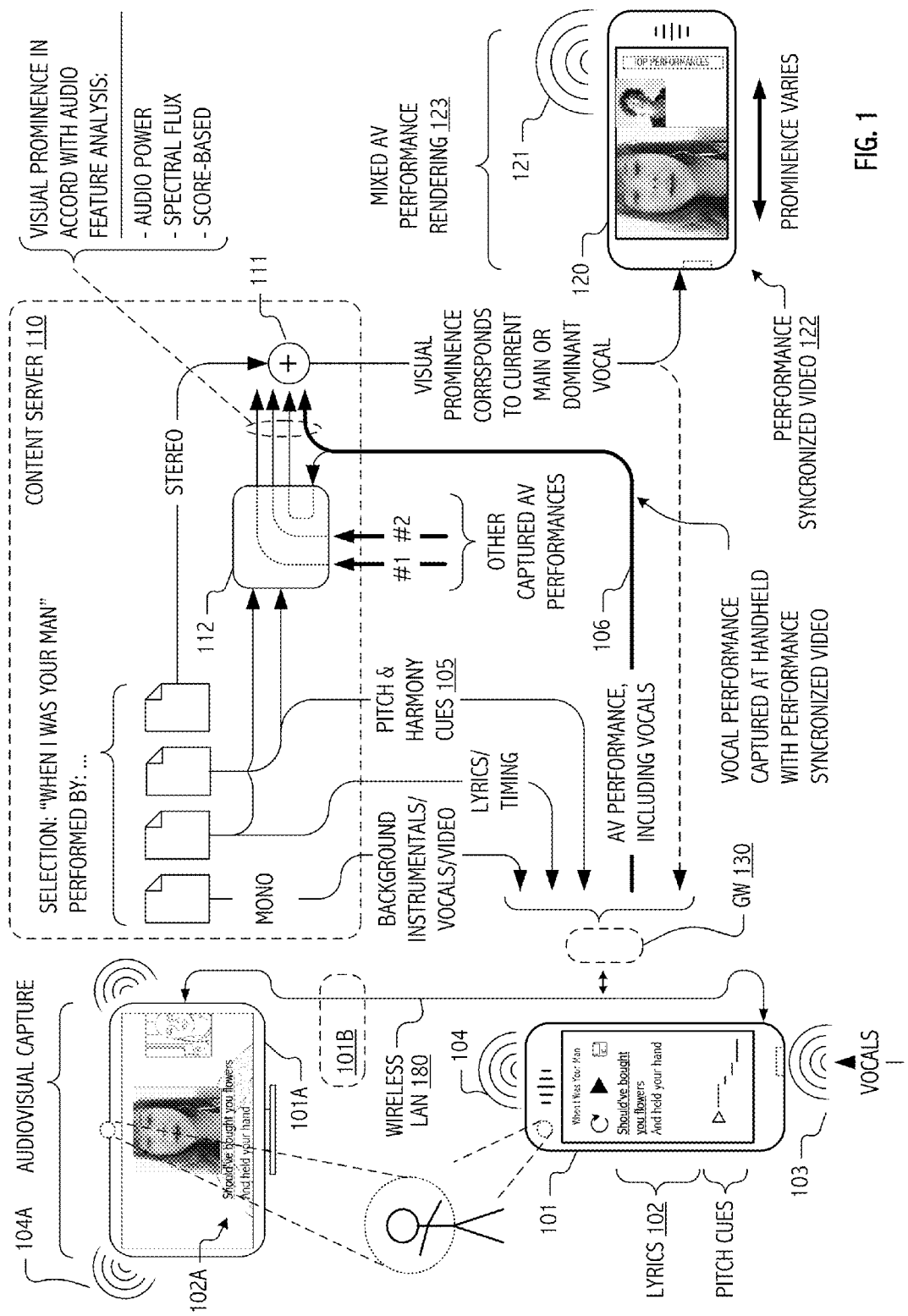
FIG. 1 depicts information flows amongst illustrative mobile phone-type portable computing devices, television-type displays, set-top box-type media application platforms, and a content server in accordance with some embodiments of the present invention.

Although embodiments of the present invention are not limited thereto, pitch-corrected, karaoke-style, vocal capture using mobile phone-type and/or television-type audiovisual equipment provides a useful descriptive context. For example, in some embodiments such as illustrated in FIG. 1, an iPhone™ handheld available from Apple Inc. (or more generally, handheld 101) hosts software that executes in coordination with a content server 110 to provide vocal capture and continuous real-time, score-coded pitch correction and harmonization of the captured vocals. Performance synchronized video may be captured using a camera provided by, or in connection with, a television (or other audiovisual equipment) 101A or connected set-top box equipment 101B such as an Apple TV™ device. Performance synchronized video may also, or alternatively, be captured using an on-board camera provided by handheld 101.

For simplicity, a wireless local area network 180 is depicted as providing communications between handheld 101, audiovisual and/or set-top box equipment (101A, 101B) and a wide-area network gateway 130. However, based on the description herein, persons of skill in the art will recognize that any of a variety of data communications facilities, including 802.11 Wi-Fi, Bluetooth™, 4G-LTE wireless, wired data networks, wired or wireless audiovisual interconnects such as in accord with HDMI, AVI, Wi-Di standards or facilities may employed, individually or in combination to facilitate communications and/or audiovisual rendering described herein.

As is typical of karaoke-style applications (such as the Sing! Karaoke™ app available from Smule, Inc.), a backing track of instrumentals and/or vocals can be audibly rendered for a user/vocalist to sing against. In such cases, lyrics may be displayed (102, 102A) in correspondence with the audible rendering so as to facilitate a karaoke-style vocal performance by a user. In the illustrated configuration of FIG. 1, lyrics, timing information, pitch and harmony cues, backing tracks (e.g., instrumentals/vocals), performance coordinated video, etc. may all be sourced from a network-connected content server 110. In some cases or situations, backing audio and/or video may be rendered from a media store such as an iTunes™ library resident or accessible from the handheld, set-top box, etc.

User vocals 103 are captured at handheld 101, pitch-corrected continuously and in real-time (either at the handheld or using computational facilities of the audiovisual display and/or set-top box equipment 101A, 101B) and audibly rendered (see 104, 104A mixed with the backing track) to provide the user with an improved tonal quality rendition of his/her own vocal performance. Pitch correction is typically based on score-coded note sets or cues (e.g., pitch and harmony cues 105), which provide continuous pitch-correction algorithms with performance synchronized sequences of target notes in a current key or scale. In addition to performance synchronized melody targets, score-coded harmony note sequences (or sets) provide pitch-shifting algorithms with additional targets (typically coded as offsets relative to a lead melody note track and typically scored only for selected portions thereof) for pitch-shifting to harmony versions of the user's own captured vocals. In some cases, pitch correction settings may be characteristic of a particular artist such as the artist that performed vocals associated with the particular backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, handheld 101, audiovisual display and/or set-top box equipment 101A, 101B, or both, may display lyrics and even visual cues related to target notes, harmonies and currently detected vocal pitch in correspondence with an audible performance of the backing track(s) so as to facilitate a karaoke-style vocal performance by a user. Thus, if an aspiring vocalist selects "When I Was Your Man" as popularized by Bruno Mars, your_man.json and your_man.m4a may be downloaded from the content server (if not already available or cached based on prior download) and, in turn, used to provide background music, synchronized lyrics and, in some situations or embodiments, score-coded note tracks for continuous, real-time pitch-correction while the user sings. Optionally, at least for certain embodiments or genres, harmony note tracks may be score coded for harmony shifts to captured vocals. Typically, a captured pitch-corrected (possibly harmonized) vocal performance together with performance synchronized video is saved locally, on the handheld device or set-top box, as one or more audiovisual files and is subsequently compressed and encoded for upload (106) to content server 110 as an MPEG-4 container file. MPEG-4 is an international standard for the coded representation and transmission of digital multimedia content for the Internet, mobile networks and advanced broadcast applications. Other suitable codecs, compression techniques, coding formats and/or containers may be employed if desired.

Depending on the implementation, encodings of dry vocal and/or pitch-corrected vocals may be uploaded (106) to content server 110. In general, such vocals (encoded, e.g., in an MPEG-4 container or otherwise) whether already pitch-corrected or pitch-corrected at content server 110 can then be mixed (111), e.g., with backing audio and other captured (and possibly pitch shifted) vocal performances, to produce files or streams of quality or coding characteristics selected accord with capabilities or limitations a particular target or network (e.g., handheld 120, audiovisual display and/or set-top box equipment 101A, 101B, a social media platform, etc.).

As further detailed herein, performances of multiple vocalists (including performance synchronized video) may be accreted and combined, such as to form a duet-style performance, glee club, or vocal jam session. In some embodiments, a performance synchronized video contribution (for example, in the illustration of FIG. 1, performance synchronized video 122 captured at handheld 101 or using audiovisual and/or set-top box equipment 101A, 101B) may be dynamically accorded visual prominence in the resulting mixed audiovisual performance rendering 123. In general, prominence may be accorded (112) based on amplitude of the respective vocal performance contributions, based an apparent spatial field and/or based on the part or vocal track position into which respective vocal performance contributions are placed or shifted.

In some embodiments of the present invention, social network constructs may facilitate pairings of geographically-distributed vocalists and/or formation of geographically-distributed virtual glee clubs. For example, relative to FIG. 1, a first vocalist may perform in a manner captured (with vocal audio and performance synchronized video) and uploaded (106) to a content server or service platform. Such captured audiovisual content may, in turn, be distributed to social media contacts of the first vocalist, via an open call mediated by the content server, or by electronic communication initiated by the first vocalist. In this way, the first vocalist herself (and/or the content server or service platform on her behalf) may invite others to join in a coordinated audiovisual performance.

An audiovisual capture such as illustrated and described may include vocals (typically pitch-corrected vocals) and performance synchronized video captured from an initial, or prior, contributor. Such an audiovisual capture can be (or can form the basis of) a backing audiovisual track for subsequent audiovisual capture from another (possibly remote) user/vocalist (see e.g., other captured AV performances #1, #2). In general, capture of subsequently performed audiovisual content may be performed locally or at another (geographically separated) handheld device or using another (geographically separated) audiovisual and/or set-top box configuration. In some cases or embodiments, and particularly in conjunction with living-room style, audiovisual display and/or set-top box configuration (such as using a network-connected, Apple TV device and television monitor), initial and successive audiovisual captures of additional performers may be accomplished using a common (and collocated) set of handheld devices and audiovisual and/or set-top box equipment.

Where supply and use of backing tracks is illustrated and described herein, it will be understood, that vocals captured, pitch-corrected (and possibly, though not necessarily, harmonized) may themselves be mixed to produce a "backing track" used to motivate, guide or frame subsequent vocal capture. Furthermore, additional vocalists may be invited to sing a particular part (e.g., tenor, part B in duet, etc.) or simply to sing, whereupon content server 110 may pitch shift and place their captured vocals into one or more positions within a duet or virtual glee club. These and other aspects of performance accretion are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

Dynamic Visual Prominence

Figure 2A:
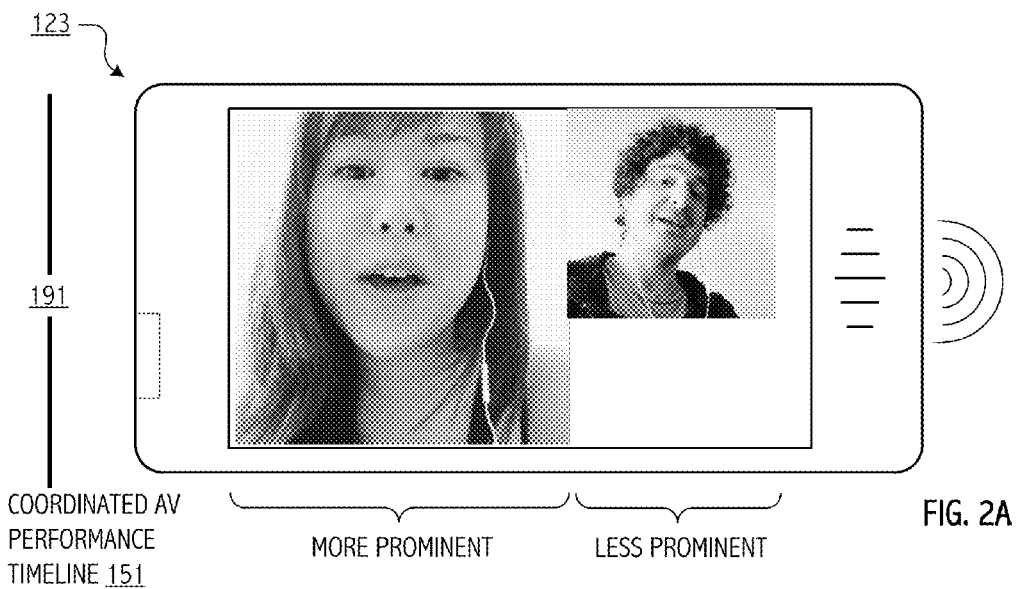
FIGS. 2A, 2B and 2C are successive snapshots of vocal performance synchronized video along a coordinated audiovisual performance timeline wherein, in accordance with some embodiments of the present invention, video for one, the other or both of two contributing vocalist is prominently displayed based on computationally-defined audio features extracted from or computed over the captured vocals.
Figure 2B:
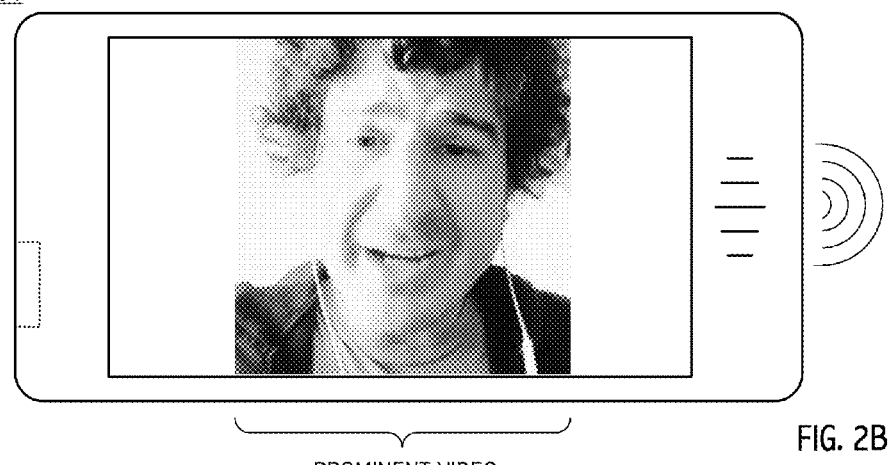
Figure 2C:
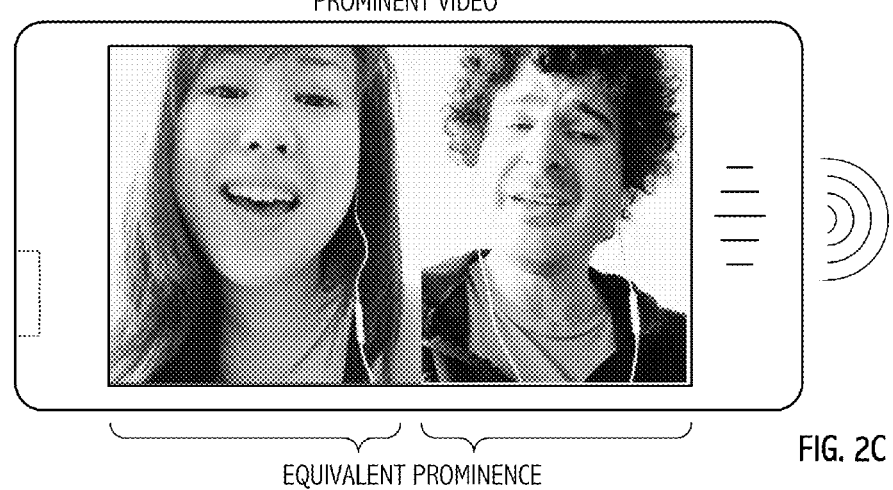

FIGS. 2A, 2B and 2C are successive snapshots of vocal performance synchronized video along a coordinated audiovisual performance timeline 151 of mixed audiovisual performance rendering 123 wherein, in accordance with some embodiments of the present invention, video for one, the other or both of two contributing vocalist is prominently displayed (or more and less prominently displayed) based on computationally-defined audio features extracted from (or computed over) the captured vocals. Thus, as an example, FIGS. 2A, 2B and 2C illustrate a temporal sequence of mixed audiovisual performance rendering 123 prepared (recall FIG. 1) at content server 110 based on manipulation (at 112) of vocals and performance synchronized video captured at handheld 101 and/or using audiovisual display and/or set-top box equipment 101A, 101B in combination with at least one other captured audiovisual performance (#1 or #2).

Throughout the temporal course of the combined and mixed audiovisual performance rendering 123, visual prominence of performance synchronized video for one performance (and/or the other) varies in correspondence with computationally-defined audio features. For example, based on a calculated audio power measure (computed over a captured vocal audio signal for each of the illustrated, and temporally-aligned, performances), video for first one of the performers may be featured more prominently than the second at a given position 191 (see FIG. 2A) along coordinated audiovisual performance timeline 151. At position 191, the vocal contribution of the first performer may have greater amplitude or have greater audio power. In some cases, a first vocalist may be singing (or be assigned) part A of a duet, whereas the second vocalist is singing (or is assigned) part B or an accompaniment or backup vocal role. In some cases, each performer may ostensibly sing the same part, but differing audio power for the individual vocal contributions is nonetheless selective (at any given point in time) for visual prominence.

Although calculated audio power may be a useful computationally-defined audio feature for dynamically varying visual prominence, in some cases, situations or embodiments, other computationally-defined audio features may be employed as an alternative to, or in combination with audio power. For example, a spectral flux or centroid may be calculated to computationally characterize quality or some other figure of merit for a given vocal performance and may be used to select one performance or the other for visual prominence and, indeed, to dynamically vary and scale such visual prominence over the course of coordinated audiovisual performance timeline 151. Likewise, computational measures of tempo and/or pitch correspondence of a particular vocal performance with a melody or harmony track or a score may be used to select and dynamically vary visual prominence of one performance and/or the other. In this regard, it will be understood that computational measures of correspondence of vocal pitch with targets of a melody or harmony track may be calculated based on captured dry vocals (e.g., before or without pitch correction) or may be calculated after (or with benefit of) pitch correction to nearest notes or to pitch targets in a vocal score.

Figure 3:
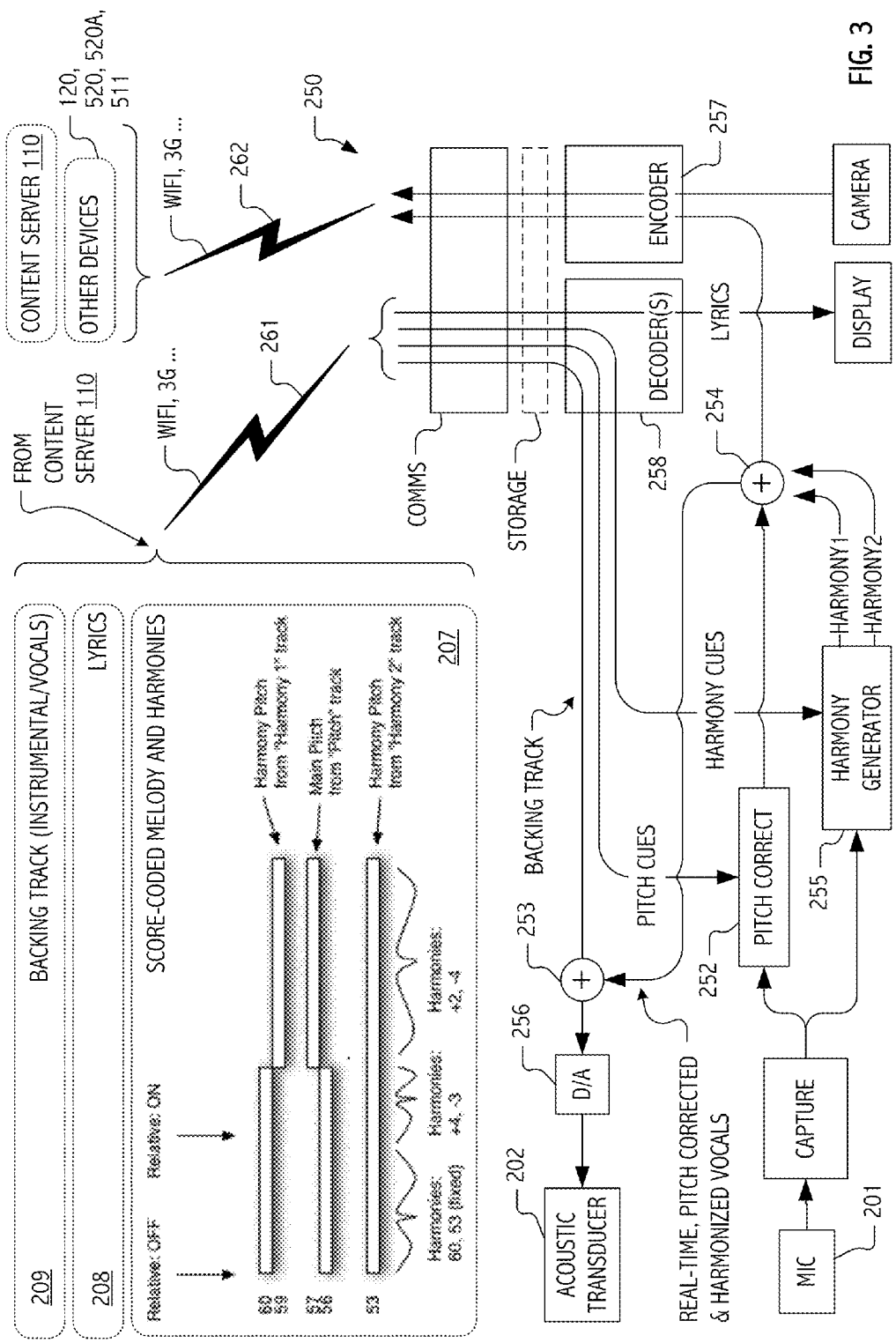
FIG. 3 is a flow diagram illustrating, for a captured audiovisual performance and optional real-time continuous pitch-correction and harmony generation based on score-coded pitch correction settings in accordance with some embodiments of the present invention.

See FIG. 3 for a computational flow diagram illustrating use of score-coded melody and harmony tracks for correction (252) and/or shifting (255) captured vocals in accord with pitch targets. Persons of skill in the art having benefit of the present description will appreciate that magnitudes of pitch corrections or shifts to target notes may be determined as a computational by-product of pitch correction (whether performed continuously in real-time in connection with vocal capture or as post-capture signal processing at a content server or service platform) and used as a figure-of-merit for a captured vocal performance. Suitable implementations of pitch correction and pitch shifting algorithms are detailed in the aforementioned, commonly-owned, U.S. Pat. No. 8,983,829. In some situations, cases, or embodiments, lower levels of pitch correction or shift (i.e., higher figures-of-merit) for one vocal performance or another may be used to select one performance or the other for visual prominence and, as before, to dynamically vary and scale such visual prominence over the course of coordinated audiovisual performance timeline 151.

Referring back to FIGS. 2A, 2B and 2C, later in the performance timeline (see e.g., position 192, FIG. 2B), performance synchronized video for the second performer is featured more prominently than the first. Indeed, in the illustrated example, only the video for the second performer appears at position 192 along coordinated audiovisual performance timeline 151. Depending on the particulars of first and second performer captured vocals (or on a particular embodiment or operating mode thereof), second performer vocals may be the only captured vocals corresponding to position 192, or a disparity in calculated levels of computationally-defined audio feature(s) may exceed a threshold such that only the second performer's performance synchronized video is displayed.

Finally, at position 193 along coordinated audiovisual performance timeline 151, calculated levels of an operative computationally-defined audio feature(s) are such that performance synchronized video of first and second performers is displayed with equivalent visual prominence. Position 193 illustrates a dynamically determined prominence consistent with each of the performers singing in chorus (consistent with a chorus section of an otherwise part A, part B duet-style coding of a vocal score) and/or singing at generally comparable levels as indicated by calculations of audio power, spectral flux or centroids.

Positions 191, 192, and 193 along coordinated audiovisual performance timeline 151 are merely illustrative. In the illustrations, size and positioning of performance synchronized video within a visual field are generally indicative of visual prominence; however, in other cases, situations or embodiments, additional or differing indicia of visual prominence may be supported including visual brightness, saturation, color, overlay or other visual ornamentation. Based on the description herein, persons of skill in the art will appreciate a wide variety of sequencings of visual prominence states based on audio features extracted from captured audio, including sequencings based at least in part of on visual features extracted from performance synchronized video. In such cases, visual features may be used, in addition to one or more of the above-described audio features, to drive visual prominence.

Likewise, in some cases, situations or embodiments, audio prominence may be manipulated in correspondence with visual prominence, such as by adjusting amplitude of respective vocals, shifting vocals between lead melody, harmony and backup positions coded in a vocal score, and/or by selectively applying audio effects or embellishments. In coordinated audiovisual performance mixes supplied in some cases, situations or embodiments, manipulation of respective amplitudes for spatially differentiated channels (e.g., left and right channels) or even phase relations amongst such channels may be used to pan vocals for a visually less prominent performance left or right in correspondence with video of lesser prominence and/or to center more prominent vocals in a stereo field.

Score-Coded Pitch Tracks

FIG. 3 is a flow diagram illustrating real-time continuous score-coded pitch-correction and harmony generation for a captured vocal performance in accordance with some embodiments of the present invention. In the illustrated configuration, a user/vocalist sings along with a backing track karaoke style. Vocals captured (251) from a microphone input 201 are continuously pitch-corrected (252) and harmonized (255) in real-time for mix (253) with the backing track which is audibly rendered at one or more acoustic transducers 202.

Both pitch correction and added harmonies are chosen to correspond to a score 207, which in the illustrated configuration, is wirelessly communicated (261) to the device(s) (e.g., from content server 110 to handheld 101 or set-top box equipment 101B, recall FIG. 1) on which vocal capture and pitch-correction is to be performed, together with lyrics 208 and an audio encoding of the backing track 209. In some embodiments of techniques described herein, the note (in a current scale or key) that is closest to that sounded by the user/vocalist is determined based on score 207. While this closest note may typically be a main pitch corresponding to the score-coded vocal melody, it need not be. Indeed, in some cases, the user/vocalist may intend to sing harmony and the sounded notes may more closely approximate a harmony track.

Thus, a computational determination that a given vocal performance more closely approximates melody or harmony may result in a corresponding determination of visual prominence. For example, in some modes or embodiments, performance synchronized video corresponding to vocals determined to be (or pitch-corrected to) melody may be visually presented in a generally more prominent manner, while performance synchronized video corresponding to vocals determined to be (or pitch-shifted to) harmony may be visually presented with less prominence. In the computational flow of FIG. 3, pitch corrected or shifted vocals may be combined (254) or aggregated for mix (253) with an audibly-rendered backing track and/or communicated (262) to content server 110 or a remote device (e.g., handheld 120 or 520, television and/or set-top box equipment 520A, or some other media-capable, computational system 511). In some embodiments, pitch correction or shifting of vocals and resulting determinations of desired visual prominence may be performed at content server 110.

Audiovisual Capture at Handheld Device

In some embodiments (recall FIG. 1), capture of vocal audio and performance synchronized video may be performed using facilities of television-type display and/or set-top box equipment 101A, 101B. However, in other embodiments, a handheld device (e.g., handheld device 301) may itself support capture of both vocal audio and performance synchronized video. Thus, FIG. 4 illustrates basic signal processing flows (350) in accord with certain implementations suitable for an mobile phone-type handheld device 301 to capture vocal audio and performance synchronized video, to generate pitch-corrected and optionally harmonized vocals for audible rendering (locally and/or at a remote target device), and to communicate with a content server or service platform 310.

Figure 4:
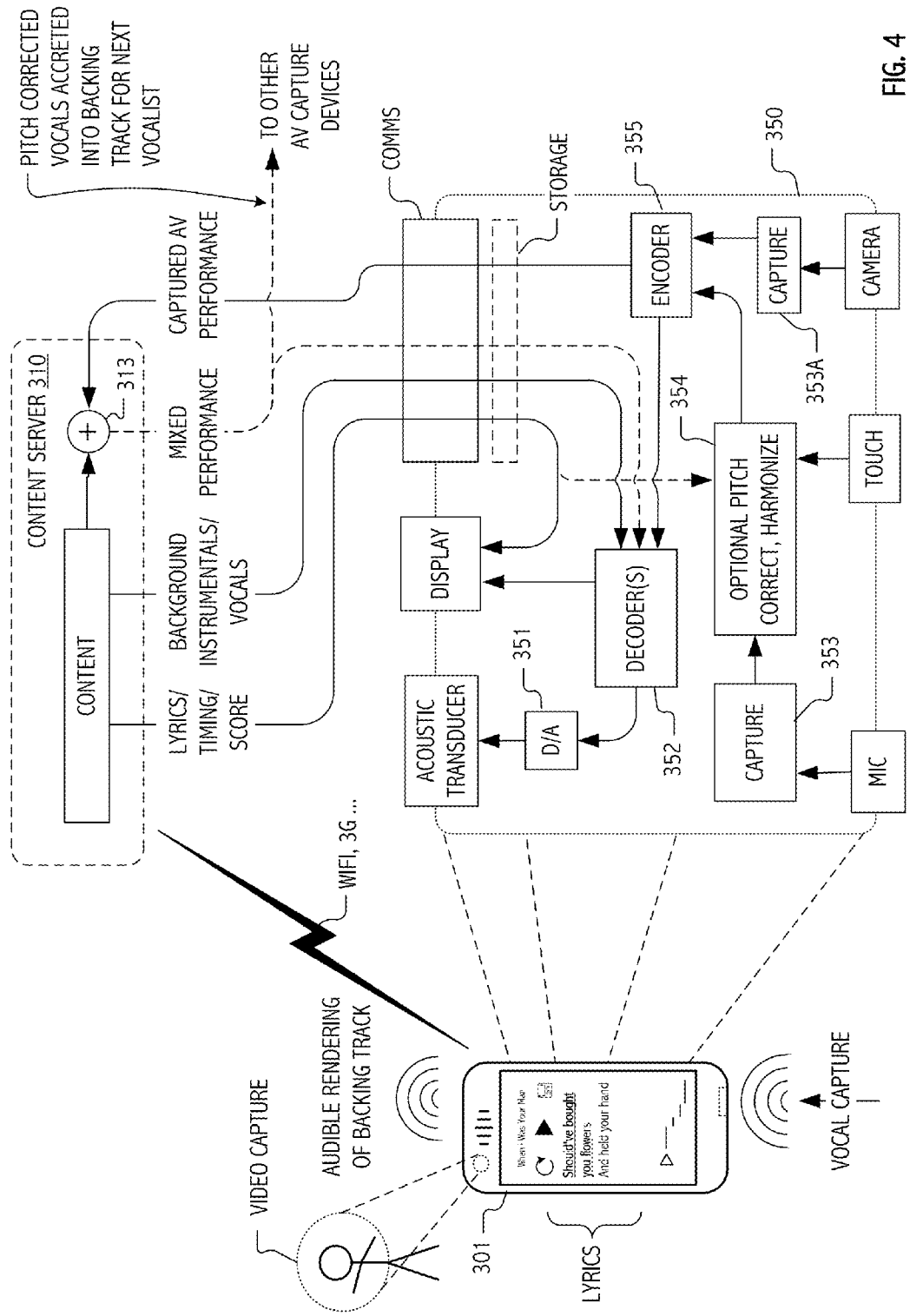
FIG. 4 is a functional block diagram of hardware and software components executable at an illustrative mobile phone-type portable computing device to facilitate processing of a captured audiovisual performance in accordance with some embodiments of the present invention.

Based on the description herein, persons of ordinary skill in the art will appreciate suitable allocations of signal processing techniques (sampling, filtering, decimation, etc.) and data representations to functional blocks (e.g., decoder(s) 352, digital-to-analog (D/A) converter 351, capture 353, 353A and encoder 355) of a software executable to provide signal processing flows 350 illustrated in FIG. 4. Likewise, relative to FIG. 3, the signal processing flows 250 and illustrative score coded note targets (including harmony note targets), persons of ordinary skill in the art will appreciate suitable allocations of signal processing techniques and data representations to functional blocks and signal processing constructs (e.g., decoder(s) 258, capture 251, digital-to-analog (D/A) converter 256, mixers 253, 254, and encoder 257) as in FIG. 2, implemented at least in part as software executable on a handheld or other portable computing device.

As will be appreciated by persons of ordinary skill in the art, pitch-detection and pitch-correction have a rich technological history in the music and voice coding arts. Indeed, a wide variety of feature picking, time-domain and even frequency-domain techniques have been employed in the art and may be employed in some embodiments in accord with the present invention. With this in mind, and recognizing that visual prominence techniques in accordance with the present inventions are generally independent of any particular pitch-detection or pitch-correction technology, the present description does not seek to exhaustively inventory the wide variety of signal processing techniques that may be suitable in various design or implementations in accord with the present description. Instead, we simply note that in some embodiments in accordance with the present inventions, pitch-detection methods calculate an average magnitude difference function (AMDF) and execute logic to pick a peak that corresponds to an estimate of the pitch period. Building on such estimates, pitch shift overlap add (PSOLA) techniques are used to facilitate resampling of a waveform to produce a pitch-shifted variant while reducing aperiodic effects of a splice. Implementations based on AMDF/ PSOLA techniques are described in greater detail in commonly-owned, U.S. Pat. No. 8,983,829, entitled "COORDINATING AND MIXING VOCALS CAPTURED FROM GEOGRAPHICALLY DISTRIBUTED PERFORMERS," and naming Cook, Lazier, Lieber, and Kirk as inventors.

An Exemplary Mobile Device

Figure 5:
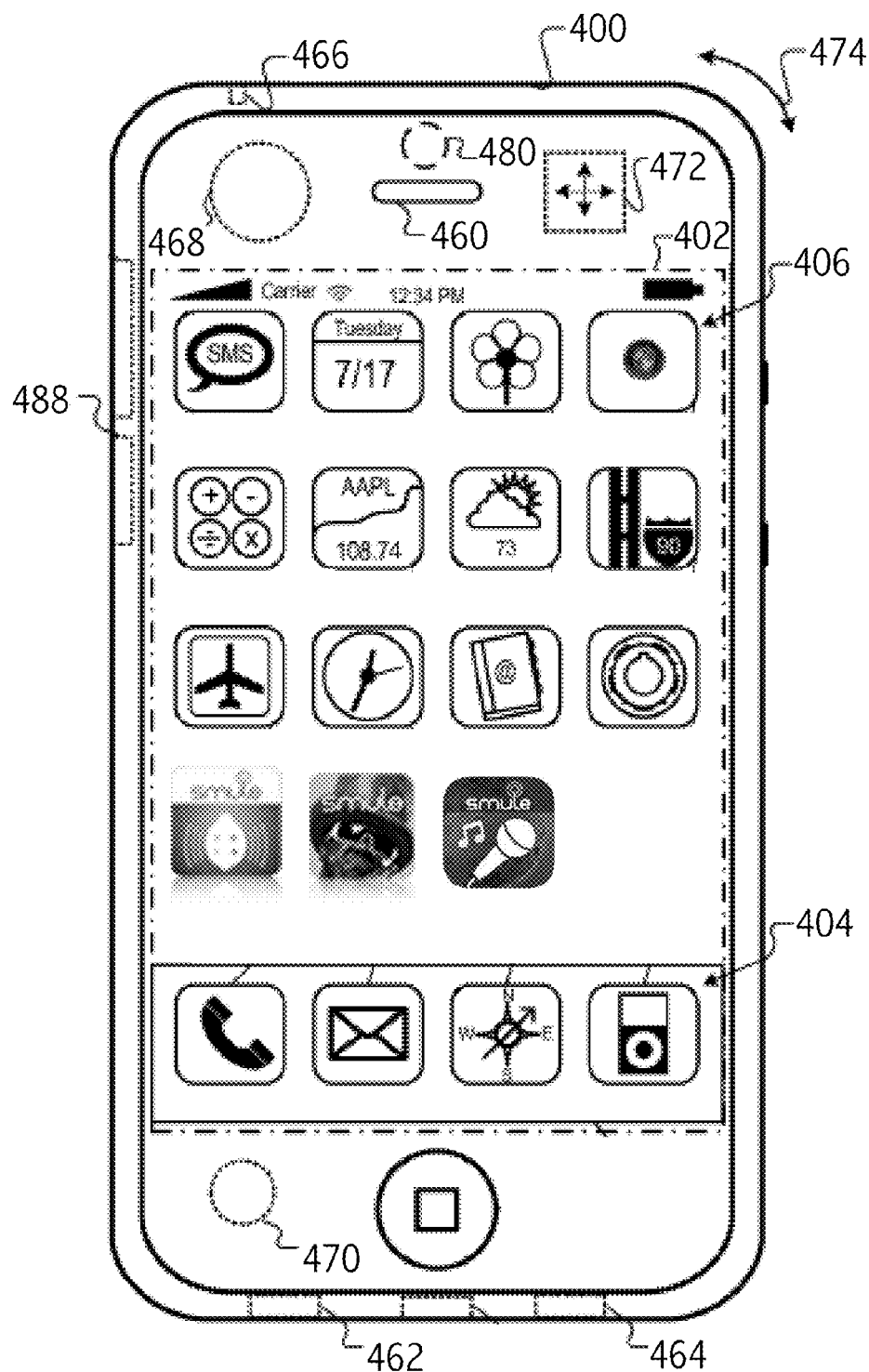
FIG. 5 illustrates features of a mobile device that may serve as a platform for execution of software implementations in accordance with some embodiments of the present invention.

FIG. 5 illustrates features of a mobile device that may serve as a platform for execution of software implementations in accordance with some embodiments of the present invention. More specifically, FIG. 5 is a block diagram of a mobile device 400 that is generally consistent with commercially-available versions of an iPhone™ mobile digital device. Although embodiments of the present invention are certainly not limited to iPhone deployments or applications (or even to iPhone-type devices), the iPhone device platform, together with its rich complement of sensors, multimedia facilities, application programmer interfaces and wireless application delivery model, provides a highly capable platform on which to deploy certain implementations. Based on the description herein, persons of ordinary skill in the art will appreciate a wide range of additional mobile device platforms that may be suitable (now or hereafter) for a given implementation or deployment of the inventive techniques described herein.

Summarizing briefly, mobile device 400 includes a display 402 that can be sensitive to haptic and/or tactile contact with a user. Touch-sensitive display 402 can support multi-touch features, processing multiple simultaneous touch points, including processing data related to the pressure, degree and/or position of each touch point. Such processing facilitates gestures and interactions with multiple fingers and other interactions. Of course, other touch-sensitive display technologies can also be used, e.g., a display in which contact is made using a stylus or other pointing device.

Typically, mobile device 400 presents a graphical user interface on the touch-sensitive display 402, providing the user access to various system objects and for conveying information. In some implementations, the graphical user interface can include one or more display objects 404, 406. In the example shown, the display objects 404, 406, are graphic representations of system objects. Examples of system objects include device functions, applications, windows, files, alerts, events, or other identifiable system objects. In some embodiments of the present invention, applications, when executed, provide at least some of the digital acoustic functionality described herein.

Typically, the mobile device 400 supports network connectivity including, for example, both mobile radio and wireless internetworking functionality to enable the user to travel with the mobile device 400 and its associated network-enabled functions. In some cases, the mobile device 400 can interact with other devices in the vicinity (e.g., via Wi-Fi, Bluetooth, etc.). For example, mobile device 400 can be configured to interact with peers or a base station for one or more devices. As such, mobile device 400 may grant or deny network access to other wireless devices.

Mobile device 400 includes a variety of input/output (I/O) devices, sensors and transducers. For example, a speaker 460 and a microphone 462 are typically included to facilitate audio, such as the capture of vocal performances and audible rendering of backing tracks and mixed pitch-corrected vocal performances as described elsewhere herein. In some embodiments of the present invention, speaker 460 and microphone 662 may provide appropriate transducers for techniques described herein. An external speaker port 464 can be included to facilitate hands-free voice functionalities, such as speaker phone functions. An audio jack 466 can also be included for use of headphones and/or a microphone. In some embodiments, an external speaker and/or microphone may be used as a transducer for the techniques described herein.

Other sensors can also be used or provided. A proximity sensor 468 can be included to facilitate the detection of user positioning of mobile device 400. In some implementations, an ambient light sensor 470 can be utilized to facilitate adjusting brightness of the touch-sensitive display 402. An accelerometer 472 can be utilized to detect movement of mobile device 400, as indicated by the directional arrow 474. Accordingly, display objects and/or media can be presented according to a detected orientation, e.g., portrait or landscape. In some implementations, mobile device 400 may include circuitry and sensors for supporting a location determining capability, such as that provided by the global positioning system (GPS) or other positioning systems (e.g., systems using Wi-Fi access points, television signals, cellular grids, Uniform Resource Locators (URLs)) to facilitate geocodings described herein. Mobile device 400 also includes a camera lens and imaging sensor 480. In some implementations, instances of a camera lens and sensor 480 are located on front and back surfaces of the mobile device 400. The cameras allow capture still images and/or video for association with captured pitch-corrected vocals.

Mobile device 400 can also include one or more wireless communication subsystems, such as an 802.11b/g/n/ac communication device, and/or a Bluetooth™ communication device 488. Other communication protocols can also be supported, including other 802.x communication protocols (e.g., WiMax, Wi-Fi, 3G), fourth generation protocols and modulations (4G-LTE), code division multiple access (CDMA), global system for mobile communications (GSM), Enhanced Data GSM Environment (EDGE), etc. A port device 490, e.g., a Universal Serial Bus (USB) port, or a docking port, or some other wired port connection, can be included and used to establish a wired connection to other computing devices, such as other communication devices 400, network access devices, a personal computer, a printer, or other processing devices capable of receiving and/or transmitting data. Port device 490 may also allow mobile device 400 to synchronize with a host device using one or more protocols, such as, for example, the TCP/IP, HTTP, UDP and any other known protocol.

Figure 6:
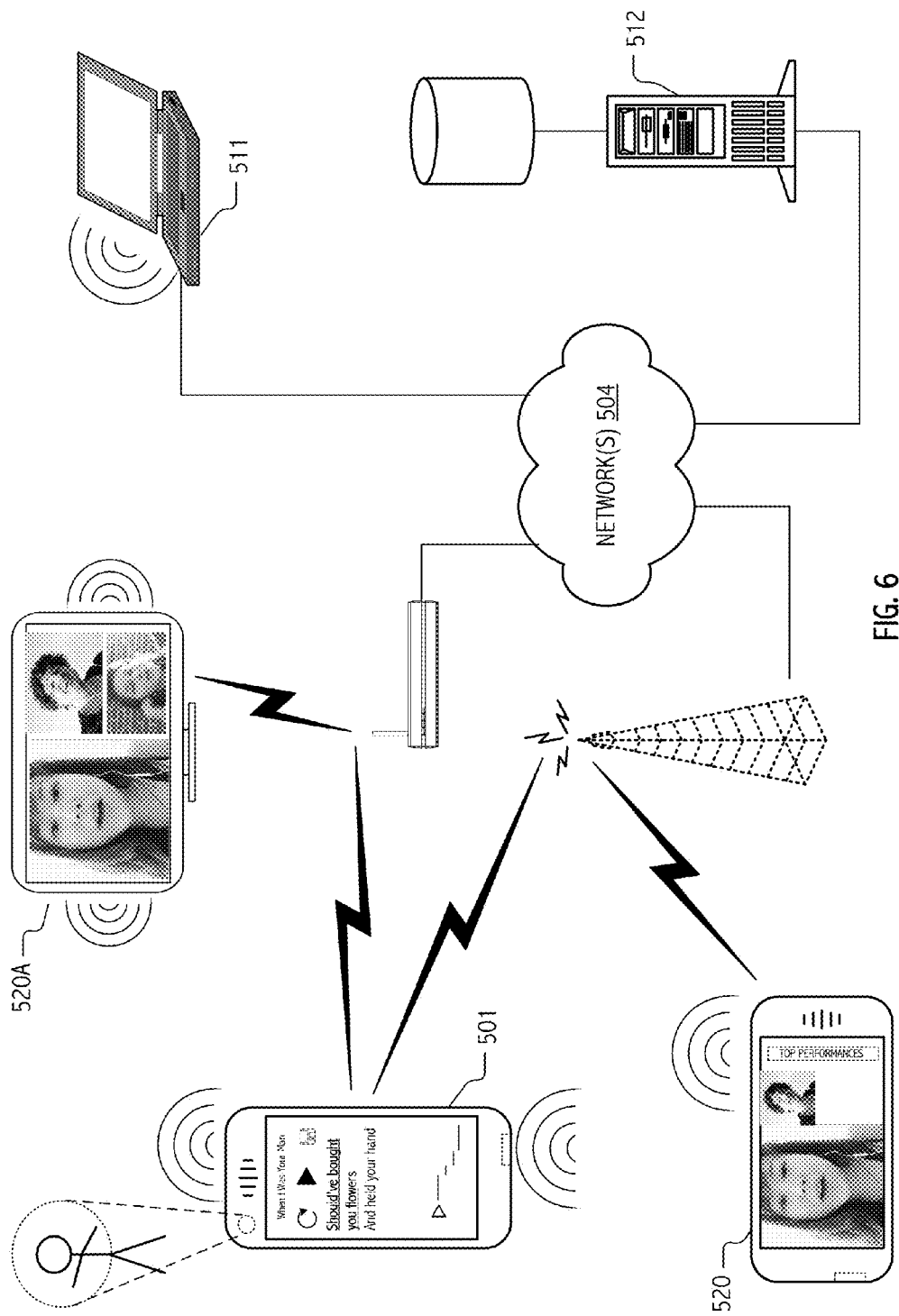
FIG. 6 is a network diagram that illustrates cooperation of exemplary devices in accordance with some embodiments of the present invention.

FIG. 6 illustrates respective instances (501 and 520) of a portable computing device such as mobile device 400 programmed with vocal audio and video capture code, user interface code, pitch correction code, an audio rendering pipeline and playback code in accord with the functional descriptions herein. Device instance 501 is depicted operating in a vocal audio and performance synchronized video capture mode, while device instance 520 operates in a presentation or playback mode for a mixed audiovisual performance with dynamic visual prominence for performance synchronized video. A television-type display and/or set-top box equipment 520A is likewise depicted operating in a presentation or playback mode, although as described elsewhere herein, such equipment may also operate as part of a vocal audio and performance synchronized video capture facility. Each of the aforementioned devices communicate via wireless data transport and/or intervening networks 504 with a server 512 or service platform that hosts storage and/or functionality explained herein with regard to content server 110, 210. Captured, pitch-corrected vocal performances with performance synchronized video mixed to vary visual prominence as described herein may (optionally) be streamed and audiovisually rendered at laptop computer 511.

OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. For example, while pitch correction vocal performances captured in accord with a karaoke-style interface have been described, other variations will be appreciated. Furthermore, while certain illustrative signal processing techniques have been described in the context of certain illustrative applications, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, media application platform, set-top box, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile or portable computing device, media device or streamer, etc.) as well as non-transitory storage incident to transmission of the information. A machine-readable medium may include, but need not be limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method of preparing coordinated audiovisual performances from geographically distributed performer contributions, the method comprising:
   receiving via a communication network, a first audiovisual encoding of a first performer, including first performer vocals captured at a first remote device and first performer video;
   receiving via the communication network, a second audiovisual encoding of a second performer, including second performer vocals captured at a second remote device and second performer video;
   determining, from the first performer vocals, at least one time-varying, computationally-defined audio feature;
   determining, from the second performer vocals, at least one time-varying, computationally-defined audio feature; and
   based on comparison of the computationally-defined audio feature determined from the first and second performer vocals, dynamically varying relative visual prominence of first and second performer video throughout a combined audiovisual performance mix of the captured first and second performer vocals with a backing track and the first and second performer video; and
   supplying the first and second remote devices with corresponding, but differing, versions of the combined audiovisual performance mix,
   wherein the combined audiovisual performance mix supplied to the first remote device features the first performer video and first performer vocals more prominently than the second performer video and second performer vocals, and
   wherein the combined performance mix supplied to the second remote device features the second performer video and second performer vocals more prominently than the first performer video and first performer vocals.

2. The method of claim 1, wherein the computationally-defined audio feature determined from the first performer vocals includes one or more of a spectral centroid, a measure of tempo correspondence with a melody track, a measure of tempo correspondence with a harmony track, a measure of pitch correspondence with a melody track, a measure of pitch correspondence with a harmony track, a measure of tempo correspondence with a score, and a measure of pitch correspondence with a score.

3. The method of claim 1,
   wherein the first and second first audiovisual encodings include, in addition to captured vocals, performance synchronized video captured at the respective remote device.

4. The method of claim 1, further comprising:
   mixing the first performer vocals with the backing track, wherein the mixing results in a first mixed audiovisual performance; and
   supplying a second remote device with the first mixed audiovisual performance,
   wherein the second performer vocals are captured against a local audio rendering, at the second remote device, of the first mixed audiovisual performance.

5. The method of claim 1,
   wherein the dynamic varying of relative visual prominence includes transitioning between prominent visual presentation of first performer video captured at the first remote device and prominent visual presentation of second performer video captured at the second remote device.

6. The method of claim 5,
   wherein the transitioning includes switching, wiping or crossfading of respective performer video.

7. The method of claim 5,
   wherein the transitioning is performed, at least in some cases, prior to a triggering change in relative values of the computationally-defined audio feature.

8. The method of claim 7,
   wherein the transitioning prominently presents performer video beginning just prior to onset of corresponding prominent vocals.

9. The method of claim 5,
wherein transitioning is subject to duration filtering or a hysteresis function.

10. The method of claim 9,
wherein duration filtering or hysteresis function parameters are selected to limit excessive visual transitions between performers.

11. The method of claim 5,
wherein the transitioning is amongst video corresponding to three or more performers and their respective vocal performances.

12. The method of claim 1,
wherein the dynamically varied relative visual prominence includes, for at least some values of the computationally-defined audio feature, visual presentation of both first and second performer video, though with differing visual prominence.

13. The method of claim 1,
wherein the dynamically varied relative visual prominence includes, for at least some values of the computationally-defined audio feature, visual presentation of both first and second performer video, with equal levels of visual prominence.

14. The method of claim 1,
wherein the dynamically varied relative visual prominence includes, for at least some values of the computationally-defined audio feature, visual presentation of first or second performer video, but not both.

15. The method of claim 1, wherein the computationally-defined audio feature is computed over pre-processed audio signals.

16. The method of claim 15, wherein the pre-processing of the audio signals includes one or more of:
application of a bark-band auditory model;
vocal detection; and
noise cancellation.

17. The method of claim 15, wherein the preprocessing is performed, at least in part, at the respective first or second remote device.

18. The method of claim 1, further comprising:
inviting via electronic message or social network posting at least the second performer to join the combined audiovisual performance.

19. The method of claim 18,
wherein the inviting includes the supplying of the second remote device with the resulting first mixed audiovisual performance.

20. The method of claim 1,
wherein the more prominently featured of the first and second performer vocals is pitch-shifted to a vocal melody position in at least one of the corresponding, but differing, combined audiovisual performance mix versions supplied, and
wherein a less prominently featured of the first and second performer vocals is pitch-shifted to a harmony position.

21. The method of claim 1,
wherein amplitudes of respective spatially differentiated audio channels of the first and second performer vocals are adjusted to provide apparent spatial separation therebetween in the supplied audiovisual performance mix versions.

22. The method of claim 1, further comprising:
supplying the first and second remote devices with a vocal score that encodes (i) a sequence of notes for a vocal melody and (ii) at least a first set of harmony notes for at least some portions of the vocal melody,
wherein at least one of the received first and second performer vocals is pitch corrected at the respective first or second remote device in accord with the supplied vocal score.

23. The method of claim 1, further comprising:
pitch correcting at least one of the received first and second performer vocals in accord with a vocal score that encodes (i) a sequence of notes for a vocal melody and (ii) at least a first set of harmony notes for at least some portions of the vocal melody.

24. The method of claim 1, further comprising:
mixing either or both of the first and second performer vocals with the backing track wherein the mixing results in a second mixed audiovisual performance, and supplying a third remote device with the second mixed audiovisual performance; and
receiving via the communication network, a third audiovisual encoding of a third performer, including third performer vocals captured at the third remote device against a local audio rendering of the second mixed performance.

25. The method of claim 24, further comprising:
including the captured third performer vocals in the combined audiovisual performance mix.

26. The method of claim 1, wherein the first and second portable computing devices are selected from the group of:
a mobile phone;
a personal digital assistant;
a laptop computer, notebook computer, a pad-type computer or netbook.

* * * * *